United States Patent [19]

Tsuboyama et al.

[11] Patent Number: 4,775,225
[45] Date of Patent: Oct. 4, 1988

[54] LIQUID CRYSTAL DEVICE HAVING PILLAR SPACERS WITH SMALL BASE PERIPHERY WIDTH IN DIRECTION PERPENDICULAR TO ORIENTATION TREATMENT

[75] Inventors: Akira Tsuboyama, Tokyo; Hitoshi Shindo, Yokohama; Kazuharu Katagiri, Tama; Junichiro Kanbe, Yokohama, all of Japan

[73] Assignee: Canon Kabushiki Kaisha, Tokyo, Japan

[21] Appl. No.: 862,978

[22] Filed: May 14, 1986

[30] Foreign Application Priority Data

May 16, 1985 [JP] Japan ................. 60-102623
May 22, 1985 [JP] Japan ................. 60-109639

[51] Int. Cl.$^4$ ............................. G02F 1/133
[52] U.S. Cl. .................. 350/344; 350/350 S
[58] Field of Search .......... 350/344, 350 S, 337, 350/334, 341, 340

[56] References Cited

U.S. PATENT DOCUMENTS

| 3,978,580 | 9/1976 | Leupp et al. | 350/344 |
| 4,295,712 | 10/1981 | Ishiwatari | 350/344 |
| 4,367,924 | 1/1983 | Clark et al. | 350/334 |
| 4,448,491 | 5/1984 | Okubo | 350/333 |
| 4,678,284 | 7/1987 | Tashiro | 350/344 |
| 4,682,858 | 7/1987 | Kanbe et al. | 350/344 |
| 4,712,875 | 12/1987 | Tsuboyama et al. | 350/344 |
| 4,728,176 | 3/1988 | Tsuboyama et al. | 350/341 |

FOREIGN PATENT DOCUMENTS

| 0028719 | 2/1983 | Japan | 350/334 |
| 0142316 | 8/1983 | Japan | 350/334 |
| 0199326 | 11/1983 | Japan | 350/334 |
| 0198428 | 11/1984 | Japan | 350/334 |
| 0057821 | 4/1985 | Japan | 350/350 S |
| 0202424 | 10/1985 | Japan | 350/344 |
| 0202423 | 10/1985 | Japan | 350/334 |
| 0244925 | 12/1985 | Japan | 350/334 |
| 0002130 | 1/1986 | Japan | 350/344 |

OTHER PUBLICATIONS

Kondo et al–"A Practical Method . . . Utilizing Spacer Edges", pp. L85-L87–Japanese Journal of Applied Physics-vol. 22, No. 2, Feb. 1983.

Primary Examiner—Stanley D. Miller
Assistant Examiner—Tai V. Duong
Attorney, Agent, or Firm—Fitzpatrick, Cella, Harper & Scinto

[57] ABSTRACT

A liquid crystal device comprising a first base plate which has projections thereon and has been subjected to a uniaxial orientation treatment, a second base plate disposed oppositely spaced from the first base plate with the projections therebetween as spacers, and a liquid crystal disposed between the first and second base plates. The projections have a section taken in parallel with the base plates, and the section has a side with a length of 0–20 μm in a direction perpendicular to the uniaxial orientation treatment. The projections may be in the form of rectangular pillars, cylindrical pillars, oval pillars, or hexagonal pillars.

5 Claims, 5 Drawing Sheets

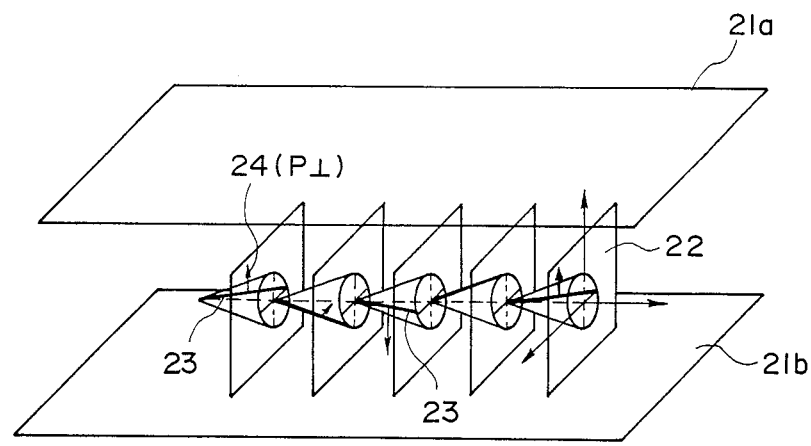
F I G. 1
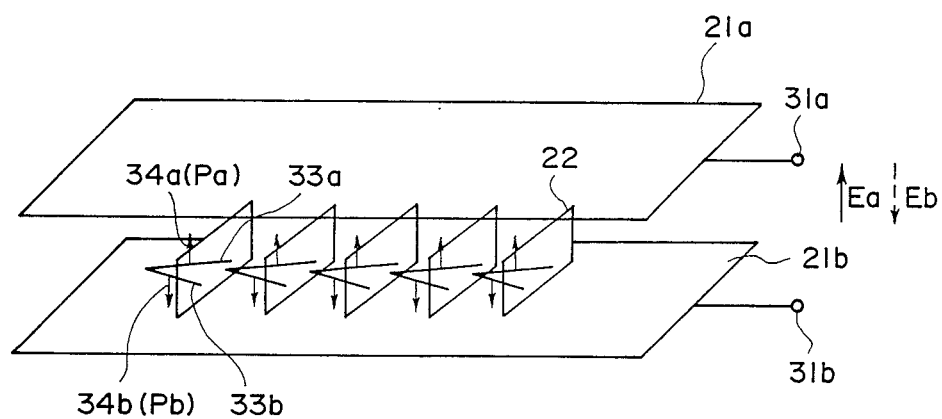
F I G. 2

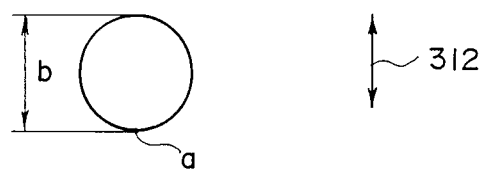
F I G. 4
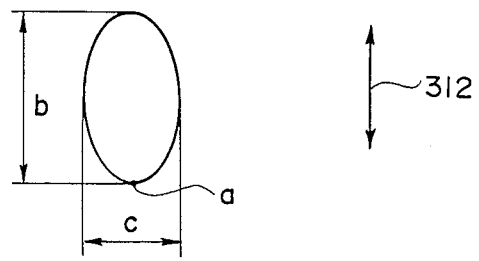
F I G. 5
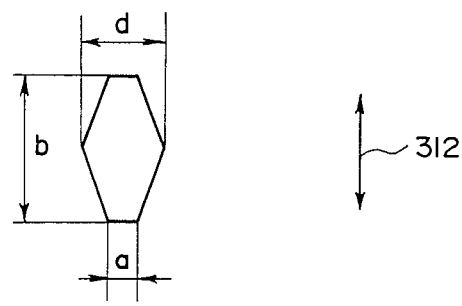
F I G. 6

LIQUID CRYSTAL DEVICE HAVING PILLAR SPACERS WITH SMALL BASE PERIPHERY WIDTH IN DIRECTION PERPENDICULAR TO ORIENTATION TREATMENT

FIELD OF THE INVENTION AND RELATED ART

The present invention relates to a liquid crystal devrce which may be applied to a liquid crystal display device, a liquid crystal-optical shutter array, etc., and more particularly to a liquid crystal device having improved display and driving characteristics through improved initial orientation or alignment of liquid crystal molecules.

In the field of liquid crystal devices, there have been a well known type of liquid crystal devices using TN (twisted nematic) type liquid crystals as shown, for example, in "Voltage-Dependent Optical Activity of a Twisted Nematic Liquid Crystal" by M. Schadt and W. Helfrich, Applied Physics Letters Vol. 18, No. 4 (Feb. 15, 1971) pp. 127-128. In this type of liquid crystal devices, the number of picture elements have been restricted, because there is a problem that a crosstalk phenomenon occurs when a device having a matrix electrode structure with a high density of picture elements is driven according to a time-sharing or time-division driving scheme.

As another type of liquid crystal device, there has been known one comprising a plurality of picture elements each switchably connected to a thin film transistor switching element. This type of liquid crystal device, however, is accompanied with problems such that production of thin film transistors on a substrate is very complicated, and production of a display device with a large picture area or screen is difficult.

In order to obviate the above-mentioned drawbacks of conventional liquid crystal devices, Clark and Lagerwall have proposed the use of a liquid crystal device having bistability (e.g., U.S. Pat. No. 4,367,924). As the liquid crystal showing bistability, a ferroelectric liquid crystal showing a chiral smectic C phase (SmC*) or H phase (SmH*) is generally used. The liquid crystal is formed in a layer having a thickness which is small enough to release or unwind the spiral structure of the ferroelectric liquid crystal by the wall effect of the substrates. As a result, the ferroelectric liquid crystal is caused to have a bistability comprising a first optically stable state and a second optically stable state. Accordingly, in contrast to conventional TN-type liquid crystals, the liquid crystal is oriented to the first stable state in response to one electric field vector and to the second stable state in response to the other electric field vector.

In order that a ferroelectric liquid crystal having bistability can realize desired driving characteristics, it is required that the liquid crystal disposed between a pair of parallel base plates has a molecular arrangement such that the molecules can effectively be switched between the two stable states.

However, with respect to such a chiral smectic liquid crystal device provided with a bistability through loosening or release of the helical structure as described above, there is a very difficult problem regarding the production of the device. More specifically, while it is necessary to make reduce the liquid crystal layer thickness corresponding to the spacing between a pair of base plates or substrates, it has been determined that orientation defects increase as the liquid crystal layer thickness becomes smaller. Moreover, it has been found that such orientation defects are caused by the presence of spacer members which are disposed to provide a uniform thickness of liquid crystal layer over the entire area of the device.

Further, in conventional optical modulation devices using a liquid crystal having bistability, a region (monodomain) where liquid crystal molecular axes are aligned substantially in parallel with the base plate faces has not been satisfactorily formed. As a result, switching threshold voltages between the bistable states are disproportionated and result in inferior driving characteristics. This defect is noticeably observed especially when matrix driving is effected by using stripe electrodes.

SUMMARY OF THE INVENTION

An object of the present invention is, in view of the above-mentioned circumstances, to provide a ferroelectric liquid crystal device for use as in display device having a high response speed characteristic, a high density of picture elements and a large display area or an optical shutter having a high shutter speed, wherein the ferroelectric liquid crystal device can perform optionally by improving the monodomain formation characteristic or the initial alignment characteristic.

Another object of the present invention is to provide a ferroelectric liquid crystal device wherein a uniform monodomain is formed and disproportionality in switching threshold voltages has been removed even when matrix driving is effected by using high-density stripe electrodes.

The present invention further provides a liquid crystal device showing good bistabilty and which is free of orientation or alignment defects over the whole area of the device despite spacers which are present within the ferroelectric liquid crystal.

More specifically, according to one aspect of the present invention, there is provided a liquid crystal device comprising a first base plate which has projections thereon and has been subjected to a uniaxial orientation treatment, a second base plate disposed oppositely spaced from the first base plate with the projections therebetween as spacers, and a liquid crystal disposed between the first and second base plates; wherein said projections have a section taken in parallel with the base plates, and the section has a side with a length of 0–20 $\mu$m in a direction perpendicular to said uniaxial orientation treatment.

As a result of further study, we have also observed that when stripe electrodes are arranged in a high density on a base plate, there remains a surface unevenness on the liquid crystal-contacting face of the base plate even after the stripe electrodes are coated with an insulating film. Such unevenness provides a causal obstacle to both the formation of a uniform monodomain and the uniformization of switching threshold voltages. Furthermore, we have found that such unevenness of the liquid crystal-contacting face of a base plate can be removed by appropriately locating spacers used for setting the liquid crystal layer thickness.

Thus, according to another aspect of the present invention, there is provided a liquid crystal device comprising a pair of base plates and a ferroelectric liquid crystal disposed in a layer therebetween, wherein at least one of said pair of base plates is provided with a plurality of transparent stripe electrodes disposed with a spacing therebetween, an insulating layer coating the stripe electrodes, and spacers for setting the thickness of the liquid crystal layer disposed on the insulating layer in such a manner as to cover the spacing between the stripe electrodes.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 1 and 2 are schematic perspective views illustrating the basic operation principle of a liquid crystal device using a chiral smectic liquid crystal;

FIGS. 4, 5 and 6 are plan views showing a spacer shape;

DETAILED DESCRIPTION OF PREFERRED EMBODIMENTS

Figure 3A:
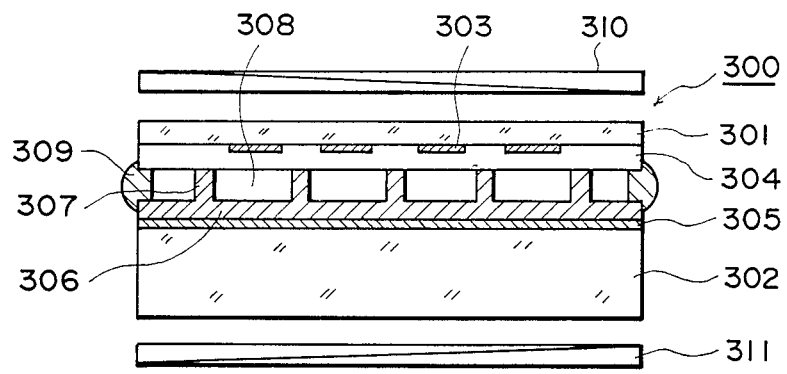
FIG. 3A is a sectional view of an embodiment of the liquid crystal device according to the present invention.

Referring to FIG. 1, there is schematically shown an example of a ferroelectric liquid crystal cell for explanation of the operation thereof. Reference numerals $21a$ and $21b$ denote base plates (glass plates) on which a transparent electrode of, e.g., $In_2O_3$, $SnO_2$, ITO (Indium-Tin-Oxide), etc., is disposed respectively. A liquid crystal of a chiral smectic phase such as SmC* or SmH* in which liquid crystal molecular layers 22 are oriented perpendicular to surfaces of the glass plates is hermetically disposed therebetween. A full line 23 shows liquid crystal molecules. Each liquid crystal molecule 23 has a dipole moment ($P_\perp$) 24 in a direction perpendicular to the axis thereof. When a voltage higher than a certain threshold level is applied between electrodes formed on the base plates $21a$ and $21b$, a helical structure of the liquid crystal molecule 23 is loosened or unwound to change the alignment direction of respective liquid crystal molecules 23 so that the dipole moments ($P_\perp$) 24 are all directed in the direction of the electric field. The liquid crystal molecules 23 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics vary depending upon the polarity of an applied voltage.

The liquid crystal layer in the liquid crystal device of the present invention may be rendered sufficiently thin in thickness (e.g., less than $10\mu$). As the thickness of the liquid crystal layer is decreased, the helical structure of the liquid crystal molecules is loosened even in the absence of an electric field whereby the dipole moment assumes either of the two states, i.e., Pa in an upper direction $34a$ or Pb in a lower direction $34b$ as shown in FIG. 2. When electric field Ea or Eb higher than a certain threshold level and different from each other in polarity as shown in FIG. 2 is applied to a cell having the above-mentioned characteristics, the dipole moment is directed either in the upper direction $34a$ or in the lower direction $34b$ depending on the vector of the electric field Ea or Eb. In correspondence with this, the liquid crystal molecules are oriented to either a first stable state $33a$ or a second stable state $33b$.

When the above-mentioned ferroelectric liquid crystal is used as an optical modulation element, it is possible to obtain two advantages as briefly touched on hereinbefore. First is that the response speed is quite fast. Second is that the orientation of the liquid crystal shows bistability. The second advantage will be further explained, e.g., with reference to FIG. 2. When the electric field Ea is applied to the liquid crystal molecules, they are oriented to the first stable state $33a$. This state is kept stable even if the electric field is removed. On the other hand, when the electric field Ea of which direction is opposite to that of the electric field Ea is applied thereto, the liquid crystal molecules are oriented to the second stable state $33b$, whereby the directions of molecules are changed. This state is similarly kept stable even if the electric field is removed. Further, as long as the magnitude of the electric field Ea or Eb being applied is not above a certain threshold value, the liquid crystal molecules are placed in the respective orientation states. In order to effectively realize the high response speed and bistability, it is preferable that the thickness of the cell be as thin as possible.

Figure 3B:
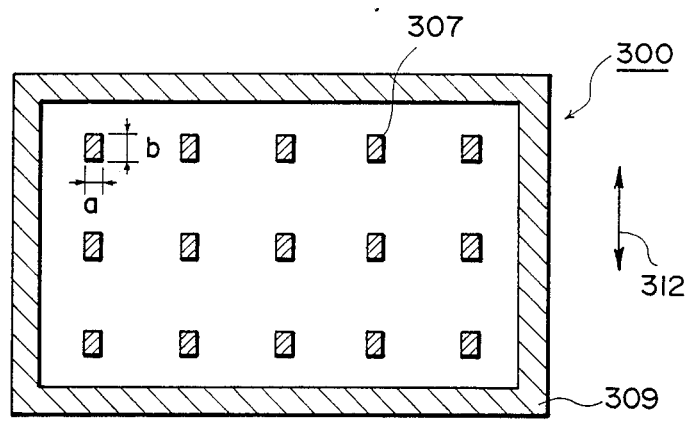
FIG. 3B is a plan view thereof.

FIGS. 3A and 3B more specifically show a liquid crystal device according to the present invention, wherein FIG. 3A is a sectional view and FIG. 3B is a plan view.

A liquid crystal device shown in FIGS. 3A and 3B comprises a base plate 301 (preferably of flexible glass or flexible plastic) and a base plate 302 (preferably, a glass plate). On the base plate 301 are successively disposed transparent electrodes 303 in the form of stripes and an orientation controlling film 304 of an insulating material applied as a coating thereon. On the other hand, on the base plate 302 are successively disposed transparent electrodes 305 crossing the transparent electrodes 303 at right angles spacers 307 disposed thereon and formed of an insulating material and an orientation controlling film 306 of an insulating material applied as a coating thereon and subjected to a uniaxial orientation treatment (rubbing, etc.) in the direction indicated by a two-headed arrow 312.

The spacers 307 used in the present invention may be formed by first forming on a base plate 302 provided with an orientation controlling film 306, an insulating film of organic resins such as polyvinyl alcohol, polyimide, polyamide-imide, polyester-imide, polyparaxylylene, polyester, polycarbonate, polyvinyl acetal, polyvinyl chloride, polyvinyl acetate, polyamide, polystyrene, cellulose resin, melamine resin, urea resin and acrylic resin, or an insulating film of an inorganic insulating material such as SiO, $SiO_2$ and $TiO_2$, and then etching the insulating film into a prescribed pattern by applying ordinary photolithographic steps. At this time, the dry thickness of the insulating film formed into spacers corresponds to the height of the spacers.

In the present invention, the length of a side a of the spacer 307 along a direction perpendicular to the above-mentioned direction 312 of the uniaxial orientation treatment is set in the range of 0 to 20 μm, and further preferably the length of a component b in a direction parallel with the uniaxial orientation treatment direction 312 is set at 300 μm or less, whereby occurrence of orientation or alignment defects can be completely avoided. This point will be described in further detail hereinafter.

In order to effectively prevent the occurrence of orientation defects, the spacers 307 should preferably be disposed at a rate of 0.1 to 100 per $mm^2$ of the area of the liquid crystal device 300. Especially, if the dispersion rate is in the range of 0.5 to 50 per $mm^2$ of the device area, occurrence of orientation defects can be completely obviated in a bistable monodomain formed with a liquid crystal layer disposed within a sufficiently thin spacing (0.5 to 5 μm) between the base plates 301 and 302.

The shape of the spacers 307 to be used in the present invention may also be that of a cylinder, an oval pillar, or an hexagonal pillar as shown in FIGS. 4-6 instead of a rectangular pillar as has been described. The symbols or numerals a, b and 312 shown in FIGS. 4-6 have the same meanings as those in FIG. 3.

Particularly, the symbol a in FIGS. 4 and 5 indicates a point of contact of a cylindrical pillar and an oval pillar, respectively, with a direction perpendicular to the uniaxial orientation treatment direction 312, i.e., that the cylindrical pillar or the oval pillar has substantially no side length in a direction perpendicular to the uniaxial orientation treatment direction. Further, the symbol c in FIG. 5 denotes a short axis of an oval pillar in the direction perpendicular to the uniaxial orientation treatment direction. The hexagonal pillar shown in FIG. 6 has a width d in the direction perpendicular to the direction 312 and a length b in the direction 312.

The spacers 307 may preferably be disposed at a pitch of 5-50 times, particularly 10-20 times, the length b in the case of a cylindrical pillar shown in FIG. 4, and the length b corresponding to a diameter of circle on the substrate face may preferably be set to 50 μm or less. In the case of an oval pillar as shown in FIG. 5, the spacers 307 may preferably be disposed at a pitch of 5-50 times, preferably 10-20 times, the length c and the length b corresponding to a component in the rubbing direction may preferably be set to 300 μm or less. Further, in the case of a hexagonal pillar as shown in FIG. 6, the spacers 307 may preferably be disposed at a pitch of 5-50 times, particularly 10-20 times, the length d, and the length b corresponding to a component in the rubbing direction may preferably be set to 300 μm or less.

The liquid crystal shown in FIG. 3, particularly the ferroelectric chiral smectic liquid crystal 308, is sealed up with a sealing member 309 of, e.g., an epoxy adhesive, disposed at the peripheries of the base plates 301 and 302.

The liquid crystal device 300 according to the present invention is further provided with polarizers 310 and 311 disposed outside the base plates 301 and 302, respectively, in the form of cross nicols.

Orientation controlling films 304 and 306 used in the liquid crystal device 300 according to the present invention may be formed as a film of a compound such as silicon monoxide, silicon dioxide, aluminum oxide, titanium oxide, zirconia, magnesium fluoride, cerium oxide, cerium fluoride, silicon nitride, silicon carbide, and boron nitride, formed by, e.g., vapor deposition. Alternatively, they may be formed as a coating film of resins such as polyvinyl alcohol, polyimide, polyamide-imide, polyester-imide, polyparaxylylene, polyester, polycarbonate, polyvinyl acetal, polyvinyl chloride, polyvinyl acetate, polyamide, polystyrene, cellulose resin, melamine resin, urea resin and acrylic resin. The thickness of the orientation controlling films 304 and 306 may ordinarily be set within the range of 50 Å to 5μ, preferably 500 Å to 5000 Å.

The orientation controlling films 304 and 306 may have an effect or function of orienting the molecular axial or alignment direction of a uniaxial liquid crystal (one appearing in smectic A phase, nematic phase, etc., appearing at a higher temperature than the ferroelectric chiral smectic liquid crystal phase) in one direction. A specific uniaxial orientation treatment adopted for this purpose may be the rubbing method which comprises rubbing a base plate face in one direction or the oblique vapor deposition method. In FIG. 3B, the rubbing direction is expressed by a two-headed arrow 312.

The ferroelectric chiral smectic liquid crystal 308 used in the liquid crystal device 300 according to the present invention may preferably be one causing phase transition of isotropic phase (Iso)→cholesteric phase (Ch)→smectic A phase (SmA)→chiral smectic phase or one causing phase transition of isotropic phase→SmA→ chiral smectic phase, respectively, on gradual cooling at a rate of, e.g., 0.5° C./hr to 5° C./hr.

Figure 8:
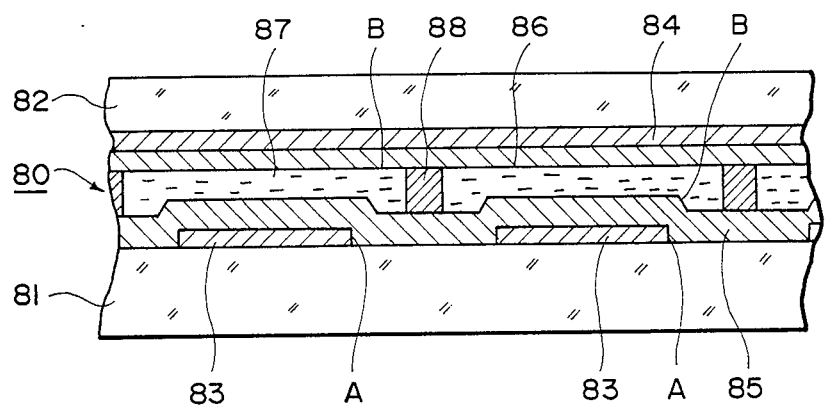
FIGS. 8 and 10 are partial sectional views across the thickness of liquid crystal devices of Comparative Example 1 and the Example, respectively, appearing hereinafter.
Figure 9:
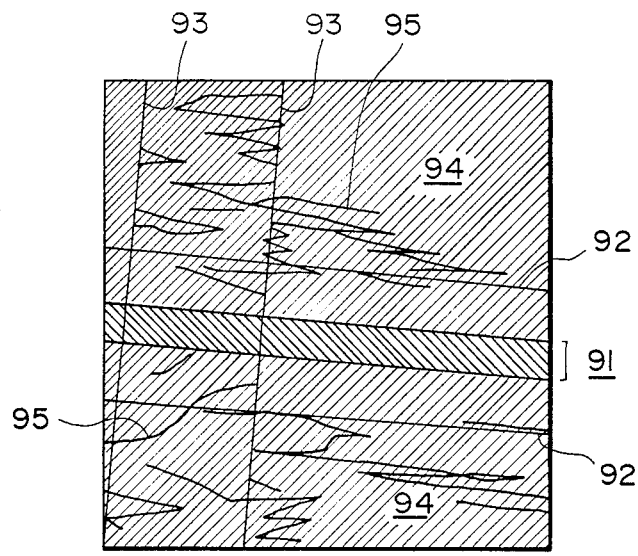
FIG. 9 shows a sketch of orientation defects observed through a polarizing microscope with respect to the device shown in FIG. 8.

FIG. 8 is an enlarged partial sectional view of a ferroelectric liquid crystal device in which stripe electrodes are arranged at a high density, and FIG. 9 shows a sketch of a viewfield through a microscope of orientation defects appearing in such a ferroelectric liquid crystal device.

More specifically, a ferroelectric liquid crystal device shown in FIG. 8 comprises a pair of parallel base plates 81 and 82, on which are respectively disposed stripe electrodes 83 and 84 constituting a matrix electrode structure. The stripe electrodes 83 and 84 are generally formed of transparent conductor films such as ITO (indium-tin-oxide). If the stripe electrodes are arranged at a high density, e.g., 16 lines/mm, the width of the electrodes becomes extremely small to result in a high resistance. In order to obviate this problem, it is necessary to use thicker electrodes than the segment electrodes ordinarily used in desk-top calculators or watches. More specifically, the thickness of the order of 1000-3000 Å is required to provide a lower resistivity. In such a liquid crystal device with high density picture elements, there are formed steps A corresponding to the electrode thickness (1000-3000 Å) between the base plate face and the electrode face. When the base plate provided with such stripe electrodes is coated with an insulating film also serving as an orientation controlling film of the order of 1000 Å in thickness, there result in steps B on the insulating film corresponding to the steps A and almost equal to the electrode thickness.

Such steps formed on the base plate face contacting a liquid crystal may not be a significant problem for a TN-type liquid crystal formed in a thickness of the order of 10 μm or larger, but may be a serious problem for a ferroelectric liquid crystal device used in the present invention which requires a sufficiently thin liquid crystal layer of less than 10 μm, preferably less than 5 μm, for realizing bistability. More specifically, as the ferroelectric liquid crystal used in the present invention, a liquid crystal in a chiral smectic C phase or other chiral smectic phases may generally be used. In order for such a chiral smectic liquid crystal to effectively show bistability, the liquid crystal must be formed in such a thin layer that the liquid crystal assumes a non-spiral structure to provide bistable states wherein liquid crystal molecular dipole moments are oriented either in an upper direction or in a lower direction. If there are steps B of 1000 Å or larger on a base plate face contacting such a thin layer of ferroelectric liquid crystal, orientation defects develop from the steps B as the boundaries when the liquid crystal is orientation-controlled by using a cooling stage.

FIG. 9 shows a sketch of a ferroelectric liquid crystal device of a comparative example which will be described hereinafter when observed through a polarizing microscope. Portion 91 corresponds to a spacer 81 in FIG. 8 used in the liquid crystal device, a line 92 corresponds to a step B on the substrate 81 in FIG. 8, and a line 93 corresponds to a step B on the substrate 82 in FIG. 8. The portion 94 corresponds to a ferroelectric liquid crystal disposed between the opposite electrodes. A number of edge-like lines 95 appearing in the viewfield of the polarizing microscope indicate orientation defects having appeared in the ferroelectric liquid crystal.

In this way, if steps of 1000 Å or larger on a face contact a ferroelectric liquid crystal, orientation defects develop and hinder the formation of a monodomain of the ferroelectric liquid crystal.

Figure 10:
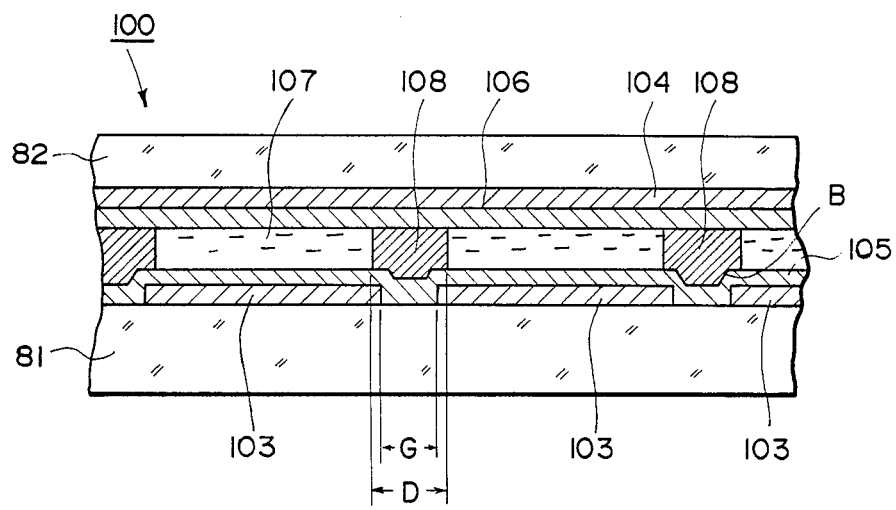

The liquid crystal device according to the present invention has been developed to overcme the above problems by appropriately determining the location of spacers which are disposed to set the liquid crystal layer thickness. FIG. 10 shows a sectional view taken across the thickness of an embodiment 100 of the device.

Referring to FIG. 10, on one base plate 81 among a pair of transparent base plates 81 and 82 each comprising glass, plastic, etc., transparent stripe electrodes 103 of ITO (indium-tin-oxide), $SnO_2$, $In_2O_3$, etc., are formed in a width of 100 to 1000 μm and a thickness of 500 to 3000 Å with a gap (G) of the order of 10 to 100 μm. Coating the stripe electrodes 103, an insulating film 105 of polyimide, polyvinyl alcohol, etc., is formed in a thickness of the order of 500 to 3000 Å, and further thereon, stripe spacers 108 are arranged in such a manner as to cover the gaps between the stripe electrodes.

As formed concavities formed on the insulating film 105 are generally formed inside, or in a smaller width than the gap between the stripe electrodes 103, the width D on a spacer 108 may be of the same order as the spacing G between the electrodes, and preferably and a little larger than the spacing G, e.g., satisfying the relationship to D=1.2G or 1.5G.

Further, also on the other transparent base plate 82, transparent stripe electrodes 104 and an insulating film 106 are formed, and spacers (not shown) are similarly formed in such an arrangement as to cover the gaps between the stripe electrodes. Then, one or both of the base plates 81 and 82 provided with the stripe electrodes 103 and 104 are subjected to a uniaxial orientation treatment such as rubbing, as desired. Then, the base plates 81 and 82 are oriented so that stripe electrodes cross each other, and the periphery of the base plates is sealed up with an adhesive such as an epoxy adhesive excepting for an injection port to provide a blank cell. Then, a liquid crystal 107 heated to an isotropic phase is injected to the cell, and after sealing the injection port, the whole cell is gradually cooled from a temperature giving the isotropic phase to a temperature giving a smectic phase, whereby a liquid crystal device 100 according to the present invention is obtained.

According to the above construction, even when steps B remain from the stripe electrodes 103 after the formation of the insulating film 105 (or further 106), spacers 108 are formed to cover the steps B, so that the face of the insulating film 105 contacting the liquid crystal becomes flat. Thus, generation of orientation defects due to steps formed on a base plate contacting a liquid crystal can be avoided. Therefore, a ferroelectric liquid crystal device with a high density of stripe electrodes adapted for matrix driving is provided with a uniform monodomain, so that switching threshold voltages are uniformized.

In the above, there has been explained an embodiment wherein both the insulating film and the spacer are composed of a resin such as polyimide, it is also possible to form an insulating film with SiO or $SiO_2$ by the oblique vapor deposition and then form spacers of polyimide, etc., or to form an insulating layer of polyimide, etc., and spacers of $SiO_2$, etc. In any case, a prescribed effect may be attained by disposing the spacers so as to cover the gaps between the stripe electrodes.

Hereinbelow, the present invention will be explained more specifically by way of examples.

EXAMPLES 1-23

A glass substrate provided with stripe electrodes of ITO (indium-tin-oxide) was coated with a polyimide-forming solution (N-methylpyrrolidone solution of a polyamide acid obtained through dehydrocondensation of pyromellitic dianhydride and 4,4'-diaminodiphenyl ether) so as provide a 1500 Å-thick film after heat-curing, and then subjected to heat-curing to form a polyimide film. Two sheets of glass substrates each provided with a polyimide film in the manner as described above were prepared. On one of the two glass plates, another polyimide-forming solution ("PIQ" produced by Hitachi Kasei Kogyo K.K.) was applied so as to provide a thickness of 1 μm after curing.

Then, a positive-type resist solution ("AZ1350" produced by Shipley Co.) was applied by a spinner coater and pre-baked. The resist was exposed through a mask having a mask pattern as shown in FIG. 3B arranged at a pitch of 3 mm, and developed with a developer liquid "MF312" containing tetramethylammonium hydroxide to etch the exposed portion of the resist film and the polyimide film thereunder, followed by washing with water drying, and removal of the unexposed portion of the resist film with methyl ethyl ketone. Then, the remaining polyimide pattern was subjected to heat-curing for 60 minutes at 200° C. and for 30 minutes at 350° C., thereby to form polyimide spacers having a rectangular pillar pattern as shown in FIGS. 3A and 3B.

Then, the substrate was rubbed with a cloth in the direction of the sides b of the rectangular pillar spacers, followed by successive washing with water and acetone, and drying.

The thus treated glass substrate provided with rectangular pillar spacers was superposed with the other glass substrate which had been treated by rubbing and coated with an epoxy adhesive by the screen printing process at the periphery thereof except for a part forming an injection port, in such a manner that their rubbing directions were parallel with each other and their stripe electrodes crossed each other. Then, the epoxy adhesive was cured to form a blank cell.

Separately, a liquid crystal material having a composition and showing a phase transition characteristic as shown below was prepared.

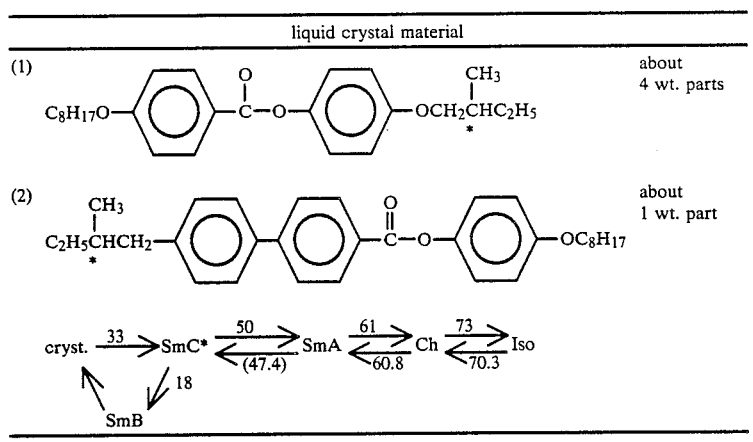

Subsequently, the above prepared blank cell was placed in a vacuum vessel to be sufficiently evacuated, and the injection port thereof was disposed in contact with the above mentioned liquid crystal material placed under isotropic phase (at about 75° C.) so that the cell interior was isolated from the exterior. Then, the pressure in the vacuum vessel was returned to an atmospheric level, whereby the liquid crystal material was injected into the cell. Then, the injection port was sealed up, and the liquid crystal material in the isotropic phase was subjected to gradual cooling at a rate of about 0.5° C./hr, thereby to undergo successive phase transition of from the isotropic phase, through cholesteric phase and smectic A phase into chiral smectic C phase. As a result, ferroelectric chiral smectic liquid crystal device (memory type device) was prepared at 28° C.

The orientation or alignment state of the liquid crystal device was observed through a polarizing microscope arranged in cross nicols. Further, the bistability of the liquid crystal device was evaluated by applying voltages of 30 volts and −30 volts.

The above procedure for preparation of a liquid crystal device and evaluation thereof was repeated by using masks having a mask pattern as shown in FIG. 3B but with different sizes of a and b. Thus, liquid crystal devices with different spacer sizes were prepared and evaluated in the manner as described above.

Figure 7:
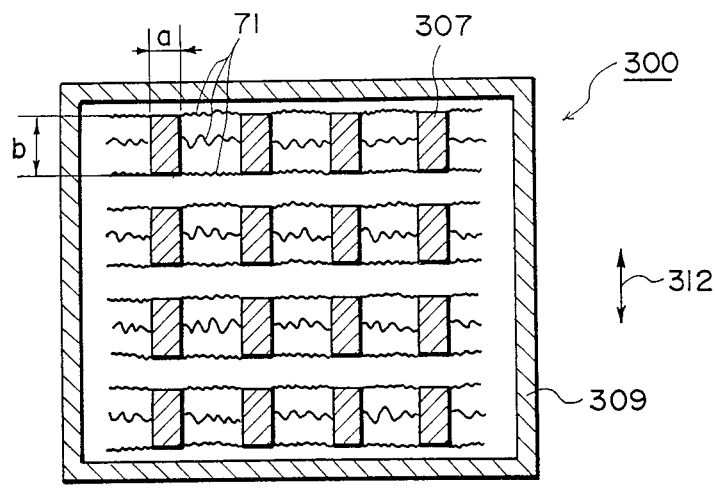
FIG. 7 shows a sketch of orientation defects occurred in a comparative device.

The results of these experiments are summarized in Table 1 below. In Table 1, a symbol O denotes a sample device which showed a good orientation state where no orientation defects were observed at all and showed a good bistability; Δ denotes a sample device which provided some orientation defects but showed a practically acceptable level of bistability; and x denotes a sample device which provided a large number of orientation defects as shown in FIG. 7 by way of a sketch and was impossible for practical use. In FIG. 7, the same reference numerals as in FIG. 3 denote the same members.

TABLE 1

| Device Sample No. | Length of Side $a$ (μm) | Length $b$ of component in the rubbing direction (μm) | Orientation & Bistability evaluation |
|---|---|---|---|
| (1) | 5 | 300 | O |
| (2) | 5 | 150 | O |
| (3) | 5 | 100 | O |
| (4) | 5 | 50 | O |
| (5) | 10 | 300 | O |
| (6) | 10 | 150 | O |
| (7) | 10 | 100 | O |

TABLE 1-continued

| Device Sample No. | Length of Side $a$ (μm) | Length $b$ of component in the rubbing direction (μm) | Orientation & Bistability evaluation |
|---|---|---|---|
| (8) | 10 | 50 | O |
| (9) | 10 | 10 | O |
| (10) | 20 | 300 | Δ |
| (11) | 20 | 150 | Δ |
| (12) | 20 | 100 | O |
| (13) | 20 | 80 | O |
| (14) | 20 | 50 | O |
| (15) | 20 | 20 | O |
| (16) | 25 | 300 | x |
| (17) | 25 | 150 | x |
| (18) | 25 | 100 | x |
| (19) | 25 | 50 | x |
| (20) | 25 | 25 | x |
| (21) | 30 | 200 | x |
| (22) | 30 | 50 | x |
| (23) | 30 | 30 | O |

In view of the above results, it would be understood that liquid crystal devices free of orientation defects are produced by setting the length of side a to 20 μm or less and the length b of the rectangular pillar spacers does not provide a serious factor for generation of orientation defects.

EXAMPLES 24-=

Liquid crystal devices were prepared and evaluated in the same manner as in Examples 1-23 except that cylindrical spacers having a section as shown in FIG. 4 and having different lengths b, i.e., the length of a component in the rubbing direction, as shown in the following Table 2, were formed instead of the rectangular pillar spacers.

The results are summarized in the following Table 2.

TABLE 2

| Device Sample No. | Length $b$ in the rubbing direction | Orientation & bi-stability evaluation |
|---|---|---|
| (24) | 10 | O |
| (25) | 20 | O |
| (26) | 30 | O |
| (27) | 40 | O |
| (28) | 50 | O |
| (29) | 80 | Δ |
| (30) | 90 | Δ |
| (31) | 100 | Δ |
| (32) | 150 | x |

In view of the above results, with respect to devices wherein the length of the side a of 0 μm (i.e., the side a contacts the rubbing direction at a point), a practicable orientation state and a bistability condition are realized when the diameter b is 100 μm or less, and devices completely free of orientation states can be obtained especially when the diameter b is 50 μm or less.

EXAMPLES 33–40

Liquid crystal devices were prepared and evaluated in the same manner as in Examples 1–23 except that oval pillar spacers having a section as shown in FIG. 5 and having a length b in the rubbing direction (long axis) and a short axis c, as shown in the following Table 3, were formed instead of the rectangular pillar spacers.

The results are summarized in the following Table 3.

TABLE 3

| Device Sample No. | Length b in the rubbing direction (μm) | Short axis c (μm) | Orientation & bistability evaluation |
| --- | --- | --- | --- |
| (33) | 10 | 5 | O |
| (34) | 20 | 10 | O |
| (35) | 60 | 30 | O |
| (36) | 100 | 50 | O |
| (37) | 200 | 100 | Δ |
| (38) | 300 | 150 | Δ |
| (39) | 350 | 175 | x |
| (40) | 400 | 200 | x |

In view of the above results, with respect to liquid crystal devices using oval pillar spacers, practiable devices can be obtained when the length b is 300 μm or less, and devices completely free of orientation defects can be obtained especially when the length b is 100 μm or less.

EXAPLES 41–67

Liquid crystal were prepared and evaluated in the same manner as in Examples 1–23 except that hexagonal pillar spacers having a section as shown in FIG. 6 and having lengths a, b and d as shown in the following Table 4, were formed instead of the rectangular pillar spacers.

The results are summarized in the following Table 4.

TABLE 4

| Device Sample No. | Length b in the rubbing direction (μm) | Length a of a side vertical to the rubbing direction (μm) | Width d (μm) | Orientation & bistability evaluation |
| --- | --- | --- | --- | --- |
| (41) | 100 | 5 | 50 | O |
| (42) | 200 | 5 | 100 | O |
| (43) | 200 | 5 | 150 | O |
| (44) | 300 | 5 | 150 | Δ |
| (45) | 300 | 5 | 200 | Δ |
| (46) | 350 | 5 | 175 | Δ |
| (47) | 400 | 5 | 200 | Δ |
| (48) | 100 | 10 | 50 | O |
| (49) | 200 | 10 | 100 | O |
| (50) | 200 | 10 | 150 | O |
| (51) | 300 | 10 | 150 | O |
| (52) | 300 | 10 | 200 | O |
| (53) | 350 | 10 | 175 | Δ |
| (54) | 400 | 10 | 200 | Δ |
| (55) | 100 | 20 | 50 | O |
| (56) | 200 | 20 | 100 | O |
| (57) | 200 | 20 | 150 | O |
| (58) | 300 | 20 | 150 | Δ |
| (59) | 300 | 20 | 200 | Δ |
| (60) | 350 | 20 | 175 | x |
| (61) | 400 | 20 | 200 | x |
| (62) | 100 | 25 | 50 | x |
| (63) | 200 | 25 | 100 | x |
| (64) | 200 | 25 | 150 | x |
| (65) | 300 | 25 | 150 | x |
| (66) | 300 | 25 | 200 | x |
| (67) | 300 | 25 | 175 | x |

In view of the above results, it would be understood that were hexagonal pillar spacers having a length of side a of 20 μm or less are used, liquid crystal devices with practically no problem are obtained when the length b in the rubbing direction is 300 μm or less, but a large number of orientation defects occur to provide practically unacceptable devices when the length b is larger than 300 μm.

From the above experimental results, it would be understood that when spacers having a length of a side in a direction perpendicular to the rubbing direction of 20 μm or less are used, orientation defects are obviated and a good bistability is provided. On the contrary, if the length of the above mentioned sides exceeds 20 μm, orientation defects as shown in FIG. 7 are generated from the sides. Further, different orientation states were observe with the above mentioned lines of orientation defects as the boundaries. Thus, there were formed a plurality of domains in each of which liquid crystal molecules were uniaxially oriented and in which orientation directions were different from each other and deviated from the rubbing direction by 2°–3°. Under such orientation states, bistabilities possessed by the respective domains were remarkably different. The thus obtained devices did not have a memory characteristic, which this type of liquid crystal device inherently has, and failed to provide a good display in a prescribed driving operation.

Mechanism for occurrence of orientation defects has not been fully analyzed, we assume that if the length of a side perpendicular to the rubbing direction exceeds 20 μm, the liquid crystal molecules tend to align in parallel with the spacer wall containing the side, so that the uniaxial orientation of the liquid crystal molecules over the whole device area may be obstructed. In fact, according to our observation, orientation defects as shown in FIG. 7 occurred commonly with sample devices which used spacers having the length b exceeding 20 μm.

The above phenomenon has not been observed with respect to a nematic liquid crystal or a cholesteric liquid crystal but characteristically occurs when a chiral smectic liquid crystal is contained in a cell having such a small thickness as to relax or loosen the spiral structure thereof. Further to say, from the above experiments, it has been materially confirmed that the frequency of occurrence of defects is decreased if the length of the side b is 20 μm or less.

EXAMPLE 68

A liquid crystal device as shown in FIG. 10 was prepared.

A glass substrate provided with stripe electrodes of ITO films 103 having a width of 135 μm and a thickness of 1200 Å arranged at a pitch of 200 μm and with a spacing of about 30 μm, was coated with a polyimide-forming solution ("PIQ" produced by Hitachi Kasei Kogyo K.K.; Non-volatile matter content of 14.5 wt. %) in a thickness of 1000 Å by means of a spinner coater and heated at 120° C. for 30 min., at 200° C. for 60 min., and at 350° C. for 30 min. to form an insulating film.

Then, in the same manner as described above, the polyimide-forming solution was further applied to form a layer which was further coated with a photoresist. The thus treated substrate was further subjected to patterning exposure and etching to form polyimide spacers 108 having a width of 50 μm and a height of 1 μm at positions covering the spacings between the electrodes 103 and on the insulating film 105.

On the other hand, on a counter substrate 82 were disposed ITO stripe electrodes 104 and an insulating film 106.

The thus treated two substrates were respectively subjected to rubbing and secured to each other with their stripe electrodes crossing each other to form a blank cell. The cell was filled with DOBAMBC (decyloxybenzylidene-p'-amino-2-methylbutylcinnamate) heated to 130° C. so as to assume an isotropic phase, and after sealing the injection port, was cooled at a rate of 0.5° C. per hour to provide a liquid crystal cell containing DOBAMBC in SmC* phase.

COMPARATIVE EXAMPLE 1

A liquid crystal cell was prepared in the same manner as in Example 68 except that the ITO electrode spacing was changed to 50 μm, and after the polyimide insulating film was formed, polyimide spacers having a width of 30 μm and a height of 1 μm were formed so as to be positioned at spacings between the electrodes.

COMPARATIVE EXAMPLE 2

A liquid crystal device was prepared in the same manner as in the above Comparative Example 1 except that the order of formation of the polyimide spacers and the insulating film was reversed.

Each of the liquid crystal cell prepared in Example 68 and Comparative Examples 1 and 2, was sandwiched between a pair of polarizers arranged in cross nicols and observed through a microscope. As a result, with respect to the cell according to Example 68, the monodomain formation characteristic of the liquid crystal was good and the orientation defects were markedly fewer than in the cells of the Comparative Examples, because there was little ununiformity in insulating film thickness, i.e., little ununiformity in liquid crystal layer thickness, in the liquid crystal cell according to the Example. Incidentally, the surface evenness of the substrates provided with spacers was evaluated by means of a film thickness tester, whereby an irregularity of ±200 Å was observed with respect to the Example while an irregularity of ±700 Å was observed with respect to Comparative Example and the irregularity was noticeable in the neighborhood of spacers.

Further, in the liquid crystal device according to the present invention, there was observed little difference in switching threshold voltage between one for partial switching and one for complete switching, so that a liquid crystal device having a uniform threshold voltage over a wide area was obtained.

What is claimed is:

1. A liquid crystal device, comprising:
a pair of base plates having a ferroelectric liquid crystal disposed in a layer thereinbetween, wherein at least one of said pair of base plates is provided with a plurality of transparent stripe electrodes disposed with a spacing G therebetween,
an insulating layer coating the stripe electrodes, and
spacers for setting the thickness of the liquid crystal layer disposed on the insulating layer in such a manner so as to cover the spacing between the stripe electrodes, wherein said spacers have a width D satisfying the relatioship of D=(1.2 to 1.5)·G.

2. A liquid crystal device according to claim 1, wherein the G is in the range of 10 to 100 μm.

3. A liquid crystal device according to claim 1, wherein at least one of said pair of base plates has been subjected to a uniaxial orientation treatment.

4. A liquid crystal device according to claim 1, wherein said ferroelectric liquid crystal is a chiral smectic liquid crystal.

5. A liquid crystal device according to claim 1, wherein said pair of base plates are spaced from each other with a spacing therebetween small enough to release the spiral structure of the ferroelectric liquid crystal.

* * * * *

UNITED STATES PATENT AND TRADEMARK OFFICE
CERTIFICATE OF CORRECTION

PATENT NO. : 4,775,225
DATED : October 4, 1988
INVENTOR(S) : AKIRA TSUBOYAMA, ET AL.

It is certified that error appears in the above-identified patent and that said Letters Patent is hereby corrected as shown below:

COLUMN 7

Line 50, "to D=1.2G or 1.5G." should read
　　　　　　--of D=1.2G to 1.5G.--.

COLUMN 10

Line 46, "EXAMPLES 24-=" should read --EXAMPLES 24-32--.

COLUMN 14

Line 43, "relatioship" should read --relationship--.

Signed and Sealed this

Fourth Day of April, 1989

*Attest:*

DONALD J. QUIGG

*Attesting Officer*　　*Commissioner of Patents and Trademarks*